(12) United States Patent
Whitmyer, Jr.

(10) Patent No.: US 9,154,958 B2
(45) Date of Patent: Oct. 6, 2015

(54) SECURITY SYSTEM FOR CLOUD COMPUTING

(75) Inventor: Wesley W. Whitmyer, Jr., Stamford, CT (US)

(73) Assignee: WhitServe LLC, Stamford, CT (US)

( * ) Notice: Subject to any disclaimer, the term of this patent is extended or adjusted under 35 U.S.C. 154(b) by 191 days.

(21) Appl. No.: 13/313,882

(22) Filed: Dec. 7, 2011

(65) Prior Publication Data

US 2013/0061311 A1    Mar. 7, 2013

Related U.S. Application Data

(60) Provisional application No. 61/531,531, filed on Sep. 6, 2011.

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| H04W 12/12 | (2009.01) |
| G06F 21/34 | (2013.01) |
| G06F 21/57 | (2013.01) |
| G06F 21/30 | (2013.01) |
| G06F 21/31 | (2013.01) |

(52) U.S. Cl.
CPC ............ H04W 12/12 (2013.01); G06F 21/34 (2013.01); G06F 21/577 (2013.01); G06F 21/30 (2013.01); G06F 21/31 (2013.01)

(58) Field of Classification Search
CPC .................................................. H04W 12/12
USPC .................................................. 726/9, 22–25
See application file for complete search history.

(56) References Cited

U.S. PATENT DOCUMENTS

| | | | | |
|---|---|---|---|---|
| 5,793,951 | A  * | 8/1998 | Stein et al. ................. | 726/5 |
| 7,380,268 | B2 * | 5/2008 | Challener et al. ........... | 726/2 |
| 7,574,202 | B1 * | 8/2009 | Tsao et al. .................. | 455/411 |
| 7,774,824 | B2 * | 8/2010 | Ross .......................... | 726/2 |
| 7,808,958 | B1 * | 10/2010 | Hernacki et al. ........... | 370/338 |
| 8,522,304 | B2 * | 8/2013 | Molen et al. ............... | 726/1 |

(Continued)

OTHER PUBLICATIONS

Authentication in an Internet Banking Environment Federal Financial Institutions Examination Council 2005 (for evidence of the date given, see http://www.fdic.gov/news/news/financial/2011/fill 1050.html).*

Google Docs © 2007 Google (As crawled by internet wayback machine on Oct. 28, 2007).*

(Continued)

Primary Examiner — Dede Zecher
Assistant Examiner — Vadim Savenkov
(74) Attorney, Agent, or Firm — Whitmyer IP Group LLC (57) ABSTRACT

Security system for cloud computing that will improve the security of users' authentications to cloud data and resources. User authentication to cloud resources requires analyzing confidence in the hardware used to transmit the authentication for access to the cloud data and/or resource. User authentication can be transmitted after the user confirms administrative rights and/or physical security control over the hardware used to transmit the authentication for access to the cloud data and/or resource. The hardware used to access the cloud data and/or resource can be analyzed for malicious code before the user authentication is transmitted. The authentication can be provided on a hardware token, and the system can execute on the hardware token to analyze hardware confidence and thereafter transmit the user authentication.

29 Claims, 4 Drawing Sheets

(56) References Cited

U.S. PATENT DOCUMENTS

| | | | |
|---|---|---|---|
| 8,655,312 B2* | 2/2014 | Stahlberg et al. | 455/410 |
| 2003/0212779 A1* | 11/2003 | Boyter et al. | 709/223 |
| 2004/0103317 A1* | 5/2004 | Burns | 713/201 |
| 2006/0068811 A1* | 3/2006 | Adya et al. | 455/456.2 |
| 2006/0168653 A1* | 7/2006 | Contrera | 726/9 |
| 2013/0014263 A1* | 1/2013 | Porcello et al. | 726/25 |

OTHER PUBLICATIONS

K. Scarfone et al., "Guide to Enterprise Telework and Remote Access Security," NIST, 2009.*
P. Bahl et al., "DAIR: A framework for managing enterprise wireless networks using desktop infrastructure," in HotNets, 2005.*
B. Miller, "Choosing the Right Analyzer for your WLAN," Global Knowledge Training LLC., 2009.*

* cited by examiner

FIG. 2

SECURITY SYSTEM FOR CLOUD COMPUTING

CROSS-REFERENCE TO RELATED APPLICATIONS

The present application claims the benefit under 35 U.S.C. §119(e) of the U.S. Provisional Patent Application Ser. No. 61/531,531, filed on Sep. 6, 2011, the content of which is incorporated herein by reference.

FIELD OF THE INVENTION

This application relates to cloud computing in general, and more specifically to insecure access hardware for cloud computing in particular.

BACKGROUND OF THE INVENTION

Systems for authenticating users to computer systems and networks, including cloud-based resources, are known. The most well-known such system is a simple username and password combination. Concerns over identity theft have led users and resource providers to additional layers of security, such as longer and more complicated passwords and so-called multifactor authentication.

Multifactor authentication is fairly common now and adds a security token to the username and password combination. An underlying principle of multifactor authentication is to combine "something you know" e.g., a password, with "something you have" e.g., a security token or biometric feature. The token may be provided in software or hardware, and is usually embodied as a lengthy code, which need not, but may change according to an algorithm known to the resource provider. One example of a typical multifactor hardware token is the RSA SecurID Hardware Authenticator. The RSA SecurID authentication mechanism consists of a "token" which is assigned to a computer user and which generates an authentication code at fixed intervals (usually 60 seconds) using a built-in clock and the token's factory-encoded random key; known as the "seed". The seed is different for each token, and is loaded into the corresponding RSA SecurID server as the tokens are purchased. A user authenticating to a network resource using a SecurID token is required to enter both a personal identification number and the number being displayed at that moment on their RSA SecurID token. Some systems using RSA SecurID disregard PIN implementation altogether, and rely on password/RSA SecurID code combinations. The server, which also has a real-time clock and a database of valid cards with the associated seed records, computes what number the token is supposed to be showing at that moment in time, checks it against what the user entered, and makes the decision to allow or deny access. There are also implementations of RSA SecurID which generate the authentication information purely in software ("Soft Tokens").

In more extreme cases a multifactor token can be biometric, e.g. a retina, fingerprint, or facial scan of the authorized user. The purpose of all of these systems is to prove the identity of a person.

These systems are vulnerable however, to attempts to impersonate an authorized user by theft of the token. This can either be due to physical theft of a hardware device generating the multifactor token, such as an RSA SecurID tag, or through indirect means such as a man-in-the-middle attack ("MITM"). In the latter case, the user's transmitted multifactor authentication information is intercepted prior to reaching the desired computing resource. The authentication information can be intercepted for example, by malicious software executing on the user's access hardware. If attackers can intercept the user's authentication data, they can use the captured credentials to authenticate on their own behalf, thereby gaining access to the resource.

Antivirus software for identifying and neutralizing malicious programs on computer systems and networks is also known. This software is typically installed on a hardware device by an authenticated user. It is executed manually or automatically on a periodic basis, and also can be updated on a periodic basis in order to identify and neutralize new malicious programs as they come into existence. This type of security measure protects personal hardware internetworked to other computers from malicious attacks.

Both antivirus and user authentication software can be provided on hardware tokens such as USB sticks or other storage devices such as flash drives and the like. In these cases the security software can be executed either directly on the storage device or downloaded for execution on the hardware.

With the rapid growth of cloud computing, both the programs used and the data generated are located in the cloud, making user authentication even more important. Users want authentication systems to safeguard their data and resource providers want authentication to prevent unauthorized access to their programming resources. These security issues are exacerbated because the cloud permits users to access data and resources from multiple devices, including public computing resources or other hardware devices on which the users are not administrative users responsible for the physical security of the hardware. In such cases, the user has little if any knowledge or assurance about the security of the hardware and therefore the user's authentications for cloud data and resources are vulnerable to theft, not only by the hardware owner but by malicious code on the public hardware. What is needed therefore is a security system for cloud computing that will improve the security of users' authentications to cloud data and resources.

SUMMARY OF THE INVENTION

Accordingly, it is an object of the invention to provide a system that improves the security of user authentications entered on hardware over which users do not have administrative rights and/or physical security control.

Another object is to provide a system and method improving cloud computing security in which user authentication to cloud resources requires analyzing confidence in the hardware used to transmit the authentication for access to the cloud data and/or resource.

A further object is to provide a system and method improving cloud computing security in which user authentication is transmitted after the user confirms administrative rights and/or physical security control over the hardware used to transmit the authentication for access to the cloud data and/or resource.

Still another object is to provide a system and method improving cloud computing security in which the hardware used to access the cloud data and/or resource is analyzed for malicious code before the user authentication is transmitted.

Yet another object of the invention is to provide a system and method improving cloud computing which executes on a hardware token to analyze hardware confidence and thereafter transmit user authentication for access to the cloud data and/or resource.

These and other objectives are achieved by providing a security system for cloud computing having a computing resource available for remote access by a user over a network;

an authentication permitting use of the computing resource; hardware connected to the network for accessing the computing resource, the hardware having a processor; analyzing software executing on the processor for analyzing security of the hardware; and software executing on the processor for transmitting the authentication to the computing resource only after the analyzing software confirms security of the hardware to a predetermined trust level; whereby the risk of transmitting the authentication to the network from insecure hardware is reduced.

In some embodiments, the computing resource includes data, which may have been previously stored on the network by the user, and which may have been previously processed on the computing resource.

In some embodiments, the analyzing software is antivirus software and/or scanning software which may scans ports on the hardware.

In some embodiments, the analyzing software accepts the hardware as trusted if a user indicates administrative control over the hardware. The analyzing software may accept the hardware as trusted if a user indicates physical security control over the hardware.

In some embodiments, the analyzing software is provided on an external memory device connectable to the hardware. In some embodiments, The external memory device may include the authentication, and in some embodiments may include the transmission software.

In some embodiments, the authentication may include a multifactor in addition to username and password. In some embodiments, the multifactor may be biometric. In some embodiments, the multifactor is provided on an external memory device connectable to the hardware.

Other objects of the present invention are achieved by provision of a security system for cloud computing having a computing resource connected to a network and available for remote access by a user over the network; an authentication permitting use of the computing resource; hardware connected to the network enabling a user to access the computing resource over the network, the hardware having a processor; analyzing software executing on the processor for analyzing security of the hardware; and software executing on the processor for transmitting the authentication to the computing resource over the network only after the analyzing software confirms security of the hardware to a predetermined trust level; whereby the risk of transmitting the authentication to the network from insecure hardware is reduced.

In some embodiments, the network is the Internet. In some embodiments, the hardware is a public computer, a mobile phone, or a tablet.

Other objects of the present invention are achieved by provision of a method for cloud computing security including the steps of providing a computing resource available for remote access over a network, the computing resource requiring an authentication for use; providing hardware enabling a user to access the computing resource by transmitting the authentication, the hardware having a hardware processor; providing security analysis software executing on the hardware processor, and transmission software executing on the hardware processor; analyzing the security of the hardware using the security analysis software; transmitting the authentication to the computing resource over the network using the transmission software.

In some embodiments, the authentication is transmitted to the computing resource only after the security analysis software confirms security of the hardware to a predetermined trust level. In some embodiments, the authentication is transmitted to the computing resource only after the user confirms administrative rights over the hardware, or confirms physical security control over the hardware.

In some embodiments, the authentication is transmitted to the computing resource only after the hardware is analyzed for malicious code, or after the hardware is analyzed for open ports.

In some embodiments, the analysis software is stored on an external memory device and executes from the external memory device.

Other objects of the present invention are achieved by provision of a method for cloud computing security including the steps of providing a computing resource available for remote access over a network, the computing resource requiring an authentication for use; providing hardware enabling a user to access the computing resource by transmitting the authentication, the hardware having a hardware processor; providing transmission software executing on the hardware processor; providing security analysis software executing on an external device connectible to the hardware, and analyzing the security of the hardware using the security analysis software; and, transmitting the authentication to the computing resource over the network using the transmission software.

In some embodiments, the external device includes a USB memory device.

Other objects of the present invention are achieved by provision of a security system for cloud computing including a computing resource connected to a network and available for remote access by a user over the network; an authentication permitting use of the computing resource; hardware connected to the network enabling a user to access the computing resource over the network, the hardware having a processor; an external device connected to the hardware, and analyzing software executing on the external device for analyzing security of the hardware; and software executing on the processor for transmitting the authentication to the computing resource over the network only after the analyzing software confirms security of the hardware to a predetermined trust level; whereby the risk of transmitting the authentication to the network from insecure hardware is reduced.

In some embodiments, the external device includes a multifactor.

The invention and its particular features and advantages will become more apparent from the following detailed description considered with reference to the accompanying drawings.

DETAILED DESCRIPTION OF THE INVENTION

Figure 1:
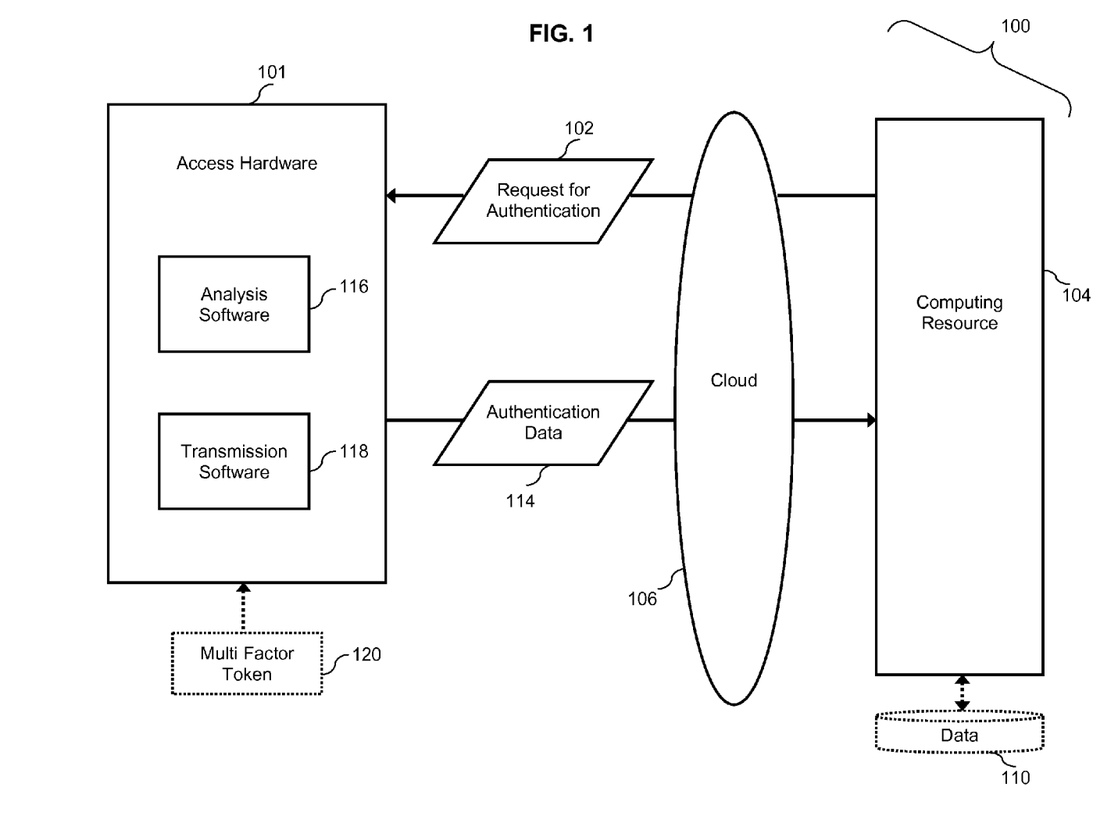
FIG. 1 illustrates an example system according to aspects of the invention.

FIG. 1 illustrates an example security system 100 for cloud computing according to aspects of the invention, where user authentications are entered on hardware over which users do not have administrative rights and/or physical security control.

Example security system 100 improves the security of user authentications by analyzing confidence in the hardware used to transmit the authentication prior to transmission.

In example system 100, access hardware 101 may be a public computer, mobile telephone, tablet computer, laptop computer, or other suitable hardware for accessing a remote computing resource. Access hardware 101 can communicate with a cloud computing resource 104 via cloud 106. The user does not have administrative rights or physical security control over access hardware 101. Access hardware 101 also has analysis software 116 as well as transmission software 118 installed.

Computing resource 104 may be a remote computer, computer server, infrastructure-as-a-service system, platform virtualization environment, platform-as-a-service system, software-as-a-service application, or any other typical cloud computing resource or group of resources, and may optionally be connected to a storage unit or database 110.

Cloud 106 may be a computer network such as the Internet or a subset of the Internet, a wide-area-network, local-area-network, private network of computing infrastructure, or other arrangement of interconnected computing equipment at the application, platform, or infrastructure level, or other cloud computing layers of abstraction.

Computing resource 104 can send a request for authentication 102 to user access hardware 101 via cloud 106. Access hardware 101 can receive the request for authentication 102.

Upon receiving a request for authentication 102, analysis software 116 thereafter analyzes confidence in the security of access hardware 101. This may entail analysis software 116 analyzing access hardware 101 for vulnerabilities such as open ports, malicious code, or insecure installed software, for example. This may also entail analysis software 116 determining whether or not the authorized user is in physical or administrative control of access hardware 101.

Analyzing access hardware 101 for hardware vulnerabilities may be performed using a port scanner, or similar techniques known in the art. Analyzing access hardware 101 for malicious software or software vulnerabilities may be performed using antivirus software, anti-spyware software, or similar software analysis tools known in the art.

Physical or administrative control may be determined by a simple confirmation, whereby the user affirms control, or by requiring the user to provide a password or multifactor authentication, for example. Analysis software 116 may also determine a confidence level in access hardware 101. For example, a confidence level in the access hardware 101 may be assigned a ranking based on its resident software, number and type of open ports, or other potential security concerns.

If access hardware 101 is determined to be trusted by analysis software 116, authentication data 114 is generated. Authentication data 114 may include one or more of a personal identifier, password, or the like, and generation of authentication data 114 may entail the user entering this information on the access hardware 101. Optionally, generation of authentication data may entail incorporating multifactor information 120, such as a mathematically generated code or biometric data, for example. Access hardware 101 then transmits authentication data 114 to computing resource 104 via cloud 106.

Figure 2:
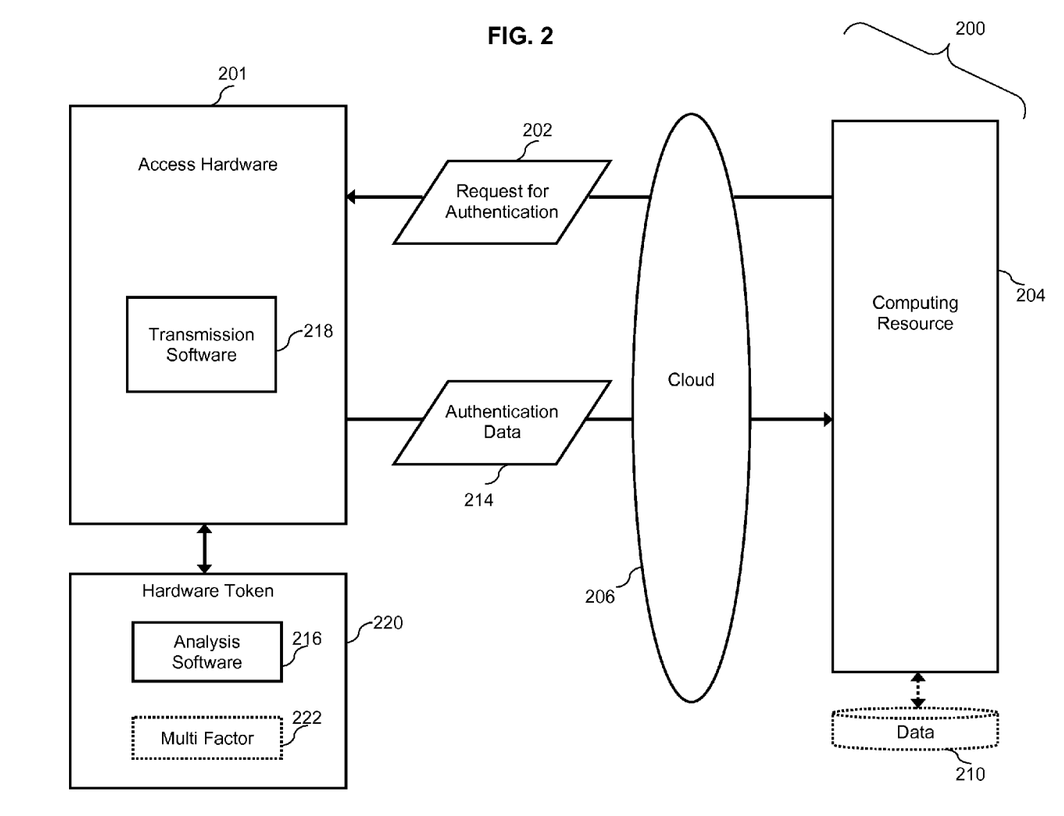
FIG. 2 illustrates another example system according to aspects of the invention.

FIG. 2 illustrates an example system 200 according to aspects of the invention, similar to system 100, except wherein analysis software for determining confidence in access hardware is executed on a hardware token.

Example system 200 improves the security of user authentications by analyzing confidence in the hardware used to transmit the authentication. Cloud computing security is further improved by executing the analysis software on a hardware token. This can have the advantage of insulating the analysis software from vulnerabilities that may be present in access hardware 201.

In example system 200, access hardware 201 may be a public computer, mobile telephone, tablet computer, laptop computer, or other suitable hardware for accessing a remote computing resource. Access hardware 201 can communicate with a cloud computing resource 204 via cloud 206. The user does not have administrative rights or physical security control over access hardware 201. Access hardware 201 also has transmission software 218 installed.

A hardware token 220 is also connected to access hardware 201. Hardware token 220 has a physical memory (not shown) with analysis software 216 installed and accessible to access hardware 201. Hardware token 220 may be a removable storage device such as a USB flash drive or other external memory device, which is connectible to access hardware 201. Optionally, hardware token 220 includes a processor (not shown), and analysis software 216 can execute on the processor to analyze access hardware 201. Optionally, transmission software 218 is provided on hardware token 220.

Computing resource 204 may be a remote computer, computer server, infrastructure-as-a-service system, platform virtualization environment, platform-as-a-service system, software-as-a-service application, or any other typical cloud computing resource or group of resources, and may be connected to a database 210. Cloud 206 may be a computer network such as the Internet or a subset of the Internet, a wide-area-network, local-area-network, private network of computing infrastructure, or other arrangement of interconnected computing equipment at the application, platform, or infrastructure level, or other cloud computing layers of abstraction.

Computing resource 204 can send a request for authentication 202 to user access hardware 201 via cloud 206. Access hardware 201 can receive request for authentication 202.

Upon receiving a request for authentication 202, analysis software 216 thereafter analyzes confidence in the security of access hardware 201. Analysis software 216 is stored and executed on external hardware token 220. This may entail analysis software 216 analyzing access hardware 201 for vulnerabilities such as open ports, malicious code, or insecure installed software, for example. This may also entail analysis software 216 determining whether or not the authorized user is in physical or administrative control of access hardware 201.

Analyzing access hardware 201 for hardware vulnerabilities may be performed using a port scanner, or similar techniques known in the art. Analyzing access hardware 201 for malicious software or software vulnerabilities may be performed using antivirus software, anti-spyware software, or similar software analysis tools known in the art.

Physical or administrative control may be determined by a simple confirmation whereby the user affirms control, or by requiring the user to provide a password or multifactor authentication, for example.

Analysis software 216 may also determine a confidence level in access hardware 201. For example, a confidence level in the access hardware 201 may be assigned a ranking based on its resident software, number and type of open ports, or other potential security concerns.

If access hardware 201 is determined to be trusted by analysis software 216, authentication data 214 is generated. Generation of authentication data 214 may entail the user entering one or more of a personal identifier, password, and the like. Optionally, generation of authentication data may entail incorporating multifactor information 222, such as a mathematically generated code or a biometric feature, for example. Access hardware 201 then transmits authentication data 214 to computing resource 204 via cloud 206.

Optionally, multifactor information 222 can be provided on external hardware token 220, for example, by incorporating an authentication code generator or biometric detector into the hardware token 220.

Storing and/or executing analysis software 216 on the hardware key 220 can have the advantage of reducing the risk of transmitting authentication information 214 from insecure hardware by decreasing the possibility that a root kit, virus, or other malicious code has compromised the analysis software 216.

Figure 3:
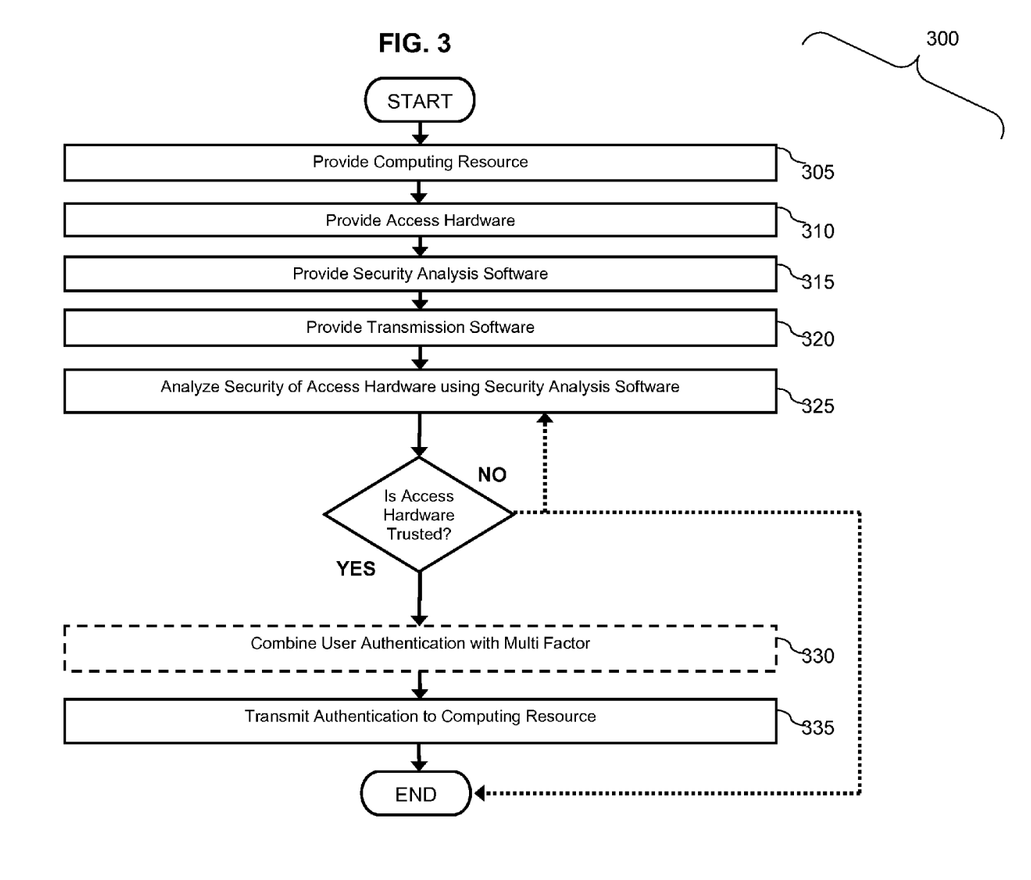
FIG. 3 illustrates an example method according to aspects of the invention.

FIG. 3 illustrates an example method 300 for secure cloud computing according to aspects of the invention, where user authentications are entered on hardware over which users do not have administrative rights and/or physical security control.

In step 305, a cloud computing resource is provided which requires an authentication for use.

The cloud computing resource may be a computer server, infrastructure-as-a-service system, platform virtualization environment, platform-as-a-service system, software-as-a-service application, or other typical cloud computing resource or group of resources, and is connected to a cloud, which may be a computer network such as the Internet or a subset of the Internet, a wide-area-network, local-area-network, private network of computing infrastructure, or other arrangement of interconnected computing equipment at the application, platform, or infrastructure level, or other cloud computing layers of abstraction. Optionally, the cloud computing resource is connected to a storage device or database.

In step 310, access hardware having a hardware processor is provided connected to the cloud, enabling the user to access the computing resource through the cloud.

The access hardware may be a public computer, mobile telephone, tablet computer, laptop computer, or other suitable hardware for accessing a remote computing resource. The access hardware can receive an authentication request from the computing resource through the cloud, and can transmit the authentication to the computing resource through the cloud.

In step 315, security analysis software is provided executing on the access hardware.

The analysis software may include antivirus software scanning the access hardware for malicious code, a port scanner detecting vulnerabilities such as open ports, or other software detecting insecure software or other forms of compromised security.

Optionally, the security analysis software determines whether or not the authorized user is in physical or administrative control of the access hardware. This may be determined by a simple confirmation whereby the user affirms control, or by requiring the user to provide a password or multifactor authentication, for example.

Optionally, the analysis software is provided on a hardware token which is connectible to the access hardware. The hardware token may include memory storing the analysis software. Optionally, the analysis software is executed on the access hardware from the hardware token. Optionally, the hardware token includes a processor, and the analysis software is executed on the hardware token to analyze the access hardware.

In step 320, transmission software is provided executing on the access hardware. The transmission software can transmit authentication information to the computing resource through the cloud.

In step 325, the access hardware is analyzed using the analysis software. If the access hardware is determined not to be trusted, the authentication information is not transmitted using the access hardware. Optionally, the access hardware may be re-scanned until it is determined to be trusted.

In optional step 330, the authentication is combined with or incorporates a multifactor. Optionally, the multifactor is provided on a hardware token connected to the access hardware. Optionally, the multifactor and analysis software are both provided on a hardware token connected to the access hardware. The hardware token may be a USB flash drive, or other suitable external memory device which is connected to the access hardware.

In step 335, authentication data is transmitted to the computing resource if the access hardware is determined to be trusted by the analysis software.

Figure 4:
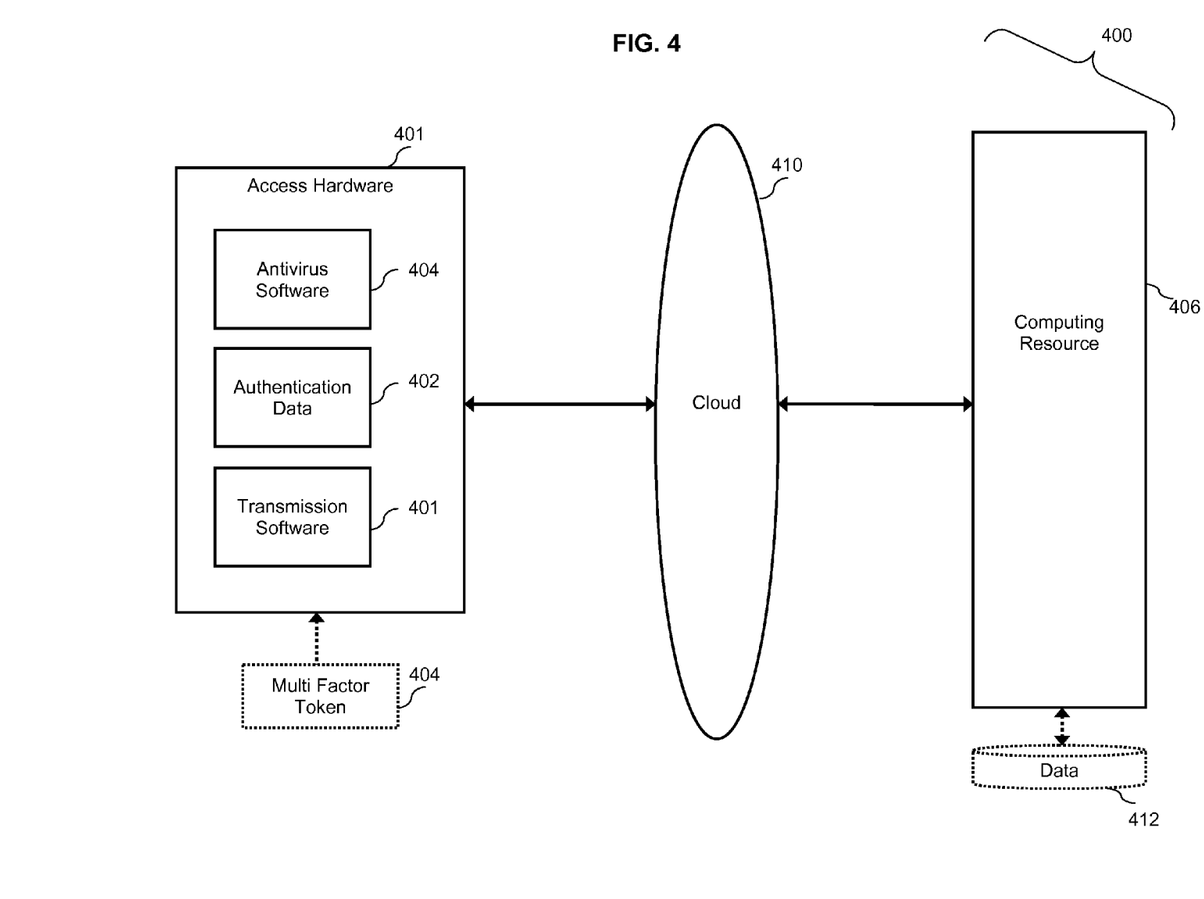
FIG. 4 illustrates an example prior art system.

FIG. 4 illustrates a prior art system 400 for cloud computing, where user authentications are entered on hardware over which users do not have administrative rights and/or physical security control.

Access hardware 402 communicates with a cloud computing resource 406 via cloud 410. The user does not have administrative rights or physical security control over access hardware 402, computing resource 406, or cloud 410. Computing resource 406 may be connected to storage or database 412. User authentication data 402 is generated by access hardware 401 and transmitted to computing resource 406 via cloud 410. Optionally, user authentication data 402 may incorporate a multifactor token 404.

Access hardware 401 is monitored by antivirus software 450. However, access hardware 401 is not analyzed to determine if access hardware 401 is trusted prior to transmitting authentication data 402. Likewise, access hardware 401 is not analyzed to determine if it meets a predetermined confidence level prior to transmitting authentication data 402.

Accordingly, it remains unclear in prior art system 400 if either the access hardware or the antivirus software have been compromised by malicious code, insecure ports or software, or are otherwise vulnerable to exploit prior to transmitting authentication data 402. User authentication data 402 is simply transmitted from access hardware 401 and received by cloud computing resource 406 via cloud 410.

In prior art system 400, there may be less assurance that the access hardware 402 is secure prior to transmission of authentication data 402, or if in fact the user authentication data 402 was transmitted by an authorized user, than would be the case according to aspects of the present invention.

Although the invention has been described with reference to a particular arrangement of parts, features and the like, these are not intended to exhaust all possible arrangements or features, and indeed many modifications and variations will be ascertainable to those of skill in the art.

What is claimed is:

1. A security system for cloud computing comprising:
   a computing resource available for remote access by a user over a network;
   an authentication permitting use of said computing resource;
   hardware connected to the network for accessing said computing resource, wherein the user does not have administrative rights and/or physical security control over said hardware;
   an external device in communication with said hardware; and
   software stored on said external device analyzing security of said hardware by scanning said hardware and preventing transmission of said authentication to said computing resource unless said software confirms security of said hardware to a predetermined trust level;

whereby the risk of transmitting said authentication to the network from insecure hardware is reduced;

wherein the computing resource sends a request for the authentication before the software analyzes the security of the hardware.

2. The security system of claim 1 in which said computing resource includes data.

3. The security system of claim 2 in which the data was previously stored on the network by the user.

4. The security system of claim 3 in which the data was previously processed on said computing resource.

5. The security system of claim 1 in which said software comprises antivirus software that scans said hardware for viruses.

6. The security system of claim 1 in which said software scans ports on said hardware.

7. The security system of claim 1 in which said authentication is stored on said external device.

8. The security system of claim 1 in which said authentication includes a multifactor in addition to username and password.

9. The security system of claim 8 in which said multifactor is biometric.

10. The security system of claim 8 in which said multifactor is stored on said external device.

11. The security system of claim 1 in which the network comprises the Internet.

12. The security system of claim 1 in which said hardware comprises a public computer.

13. The security system of claim 1 in which said external device comprises a mobile phone.

14. The security system of claim 1 in which said external device comprises a tablet.

15. The system of claim 1 wherein the software confirms security of said hardware has a confidence level ranking that meets a predetermined trust level.

16. The system of claim 1 wherein said software analyzes said hardware for software and hardware vulnerabilities.

17. The system of claim 1 wherein said external device comprises a USB device.

18. The system of claim 1 wherein said external device comprises a laptop.

19. The system of claim 1 wherein said computing resource comprises a software-as-a-service application.

20. The system of claim 1 wherein administrative rights and/or physical security control over said hardware is confirmed by the user.

21. A method for cloud computing security comprising the steps of:

providing a computing resource available for remote access over a network, the computing resource requiring an authentication for use;

providing hardware enabling a user to access the computing resource, wherein the user does not have administrative rights and/or physical security control over said hardware;

providing an external device in communication with said hardware; and providing software stored on said external device analyzing the security of the hardware by scanning said hardware and preventing the authentication from being transmitted to the computing resource unless the software confirms security of the hardware to a predetermined trust level;

whereby the risk of transmitting said authentication to the network from insecure hardware is reduced;

wherein the computing resource sends a request for the authentication before the software analyzes the security of the hardware.

22. The method of claim 21, in which the authentication is transmitted to the computing resource only after the hardware is analyzed for malicious code.

23. The method of claim 21, in which the authentication is transmitted to the computing resource only after the hardware is analyzed for open ports.

24. The method of claim 21 wherein the external device comprises a USB memory device.

25. The method of claim 21 wherein the hardware comprises a public computer.

26. The method of claim 21 wherein the external device comprises a tablet.

27. The method of claim 21 wherein the external device comprises a mobile phone.

28. The method of claim 21 wherein the external device comprises a laptop.

29. The method of claim 21 wherein said computing resource comprises a software-as-a-service application.

* * * * *